Patented Oct. 18, 1949

2,485,273

UNITED STATES PATENT OFFICE 2,485,273

COPOLYMER OF BUTADIENE-1,3 AND ALPHA METHYL PARA METHYL-STYRENE

Per K. Frolich and Erving Arundale, Westfield, N. J., assignors to Standard Oil Development Company, a corporation of Delaware No Drawing. Application March 4, 1948, Serial No. 13,094

3 Claims. (Cl. 260—83.7)

This application relates to synthetic rubber-like materials possessing improved processing qualities; and relates particularly to copolymers of diolefins with monomethyl ring-substituted alpha alkyl styrenes prepared by the emulsion technique, which possess such improved processing characteristics in the form of increased plasticity, tack, and ease of milling.

A considerable number of polymers have been prepared heretofore including polymers of butadiene, and of butadiene with various co-monomers such as acrylonitrile, styrene and various alpha alkyl styrenes, the latter being described in U. S. Patent No. 1,938,731. These copolymers are useful substitutes for natural rubber and they have many of the characteristics of natural rubber both in the raw and vulcanized conditions. However, all of these polymers are difficult to process from the standpoint of milling, compounding and mixing in of the many compounding ingredients which are required.

The present invention provides new and useful copolymerizates in which only one of the polymerizing substances is polymerizable by itself; and the resulting copolymerizate is superior to the previous diolefin-styrene copolymerizates as far as its rubber-like properties and processing characteristics are concerned. It has now been found that the diolefins will interpolymerize with monomethyl ring-substituted alpha alkyl styrenes such as para-methyl-alpha-methyl styrene and the like by an emulsion ploymerization procedure to yield substitutes for rubber which are markedly and outstandingly superior to previously prepared synthetic rubber-like substances, especially as far as their milling and processing properties are concerned.

Thus an object of the invention is to polymerize together a reactive diolefin and a substituted styrene of the general formula

CH$_3$.C$_6$H$_4$.C(R):CH$_2$ where R is an alkyl group of 1 to 3 carbon atoms, to produce a plastic copolymer which is characterized by its inherent ease of processing and milling. Other objects and details of the invention will be apparent from the following description.

Broadly, the present invention contemplates copolymerizing, in emulsion, a diolefin of 4 to 6 carbon atoms such as butadiene, chloroprene, isoprene, piperylene, dimethyl butadiene, or the like, with a monomethyl ring-substituted styrene in which an alkyl group of 1 to 3 carbon atoms is attached to the alpha position of the vinyl group. The preferred styrene is para-methyl-alpha-methyl styrene which will not polymerize alone. Other styrenes include: ortho-methyl alpha methyl styrene, meta-methyl alpha methyl styrene, para-methyl alpha ethyl styrene, para-methyl alpha propyl styrene, ortho-methyl alpha ethyl styrene, or mixtures of these, especially mixtures containing more than 50% by weight of p-methyl alpha methyl styrene.

These materials are conveniently mixed in the proportion of from 50 to 95 parts of the diolefin with 50 to 5, preferably 40 to 15, parts of the substituted styrene and emulsified in 100–300 parts of water, together with from 1 to 10 parts of an emulsifier, such as sodium oleate, sodium lauryl sulfate, or the like and from 0.1 part to 0.5 part of a catalyst, such as hydrogen peroxide, potassium persulfate, sodium perborate benzoyl peroxide or the like. To this mixture, there may be added various incidental modifiers such as certain of the higher mercaptans. The mixture is preferably emulsified by a powerful stirrer and is maintained at a temperature of from 30° C. to 60° C. for a time interval ranging from 3 to 40 hours. The resulting interpolymer is obtained in the form of an emulsion or latex from which it is conveniently recovered by the addition of a small amount of acid or a substantial amount of brine or by freezing or by other precipitating processes. The resulting coagulum is then washed, dried and compounded according to any desired formula, during which processing, it "bands" very readily on the mill, does not "bag" from the rolls at temperatures as high as 250° F. and is particularly well adapted to the incorporation of compounding agents. The compounded and cured polymer then shows an excellent tensile strength, elongation, abrasion resistance, flexure resistance, and freeze resistance.

EXAMPLE

A mixture was prepared consisting of 26 parts of para-methyl-alpha-methyl-styrene and 74 parts of butadiene, together with 200 parts of water, 5 parts of sodium oleate, 0.3 part of potassium persulfate and 0.5 part of "Lorol" mercaptan. Simultaneously, a similar mixture was prepared, in which ordinary styrene was substituted for the para-methyl-alpha-methyl-styrene. Both mixtures were adjusted to an initial pH of 9.7 and warmed in separate reactors to a reaction temperature of 45° C. Samples of the copolymer of para-methyl-alpha-methyl-styrene and butadiene were taken at the end of 20 hours and 22 hours and evaluated. The characteristics of this copolymer are shown in the accompanying Table I.

TABLE I p-methyl-alpha-methyl-styrene-butadiene copolymer

| Time | Conversion | Tensile Strength | Percent Elong. | Williams Plasticity | Banding Time |
|---|---|---|---|---|---|
| | Percent | | | | |
| 20 hrs | 58 | 3,310 | 580 | 100-2 | (1) |
| 22 hrs | 72 | 3,300 | 595 | 90-0 | (1) |

[1] Banded on rubber mill immediately and did not fall off rolls at 210° F. Samples were quite tacky.

Simultaneously, samples were taken of the ordinary styrene-butadiene interpolymer reaction at the end of 16, 18 and 20 hours and these samples also were evaluated to show the characteristics of the ordinary styrene interpolymer as given in the subjoined Table II.

TABLE II

Styrene-butadiene copolymer

| Time | Conversion | Tensile Strength | Percent Elong. | Williams Plasticity | Banding Time |
|---|---|---|---|---|---|
| | Percent | | | | |
| 16 hrs | 66 | 3,320 | 500 | 106-1 | Immediately. |
| 18 hrs | 71 | 3,140 | 430 | 122-5 | 1'48''. |
| 20 hrs | 76 | 2,890 | 400 | 132-6 | (1) |

[1] Sample fell off rolls at 123-133° F.

Comparison of the results recorded in these tables shows that the rate of conversion of the para-methyl-alpha-methyl styrene was somewhat slower than the rate of polymerization of the ordinary styrene interpolymer, but the difference is small and without particular significance. This is remarkable in light of the rapid polymerization rate of styrene alone and the fact that p-methyl-alpha-methyl styrene alone will not polymerize at all.

The tables also show that the copolymer of para-methyl-alpha-methyl styrene and butadiene has a tensile strength equal to, or slightly higher than the tensile strength of the ordinary styrene interpolymer (when compounded according to the subjoined formula). The tables also show that the elongation at break, after compounding, of the para-methyl-alpha-methyl styrene and butadiene interpolymer is substantially higher; that its plasticity, according to the Williams' method is markedly superior, and that it "bands" on a mill immediately, does not fall off the rolls at 210° F. and has a highly desirable tackiness which facilitates calendering, plying, and other similar processing steps.

The following results show the benefits to be derived by substituting para-methyl-styrene for styrene in the preparation of Buna S under approximately the same conditions as above. Butadiene is used as the diolefin in this case.

TABLE III

| Mono olefin | Conversion after 20 hrs. at 45° C. | Tensile Strength | Percent Elong. | Williams Plasticity |
|---|---|---|---|---|
| | Percent | Pounds | | |
| Styrene | 87.5 | 2160 | 350 | 158-15 |
| p-CH₃ Styrene | 80 | 3150 | 450 | [1] 153-18 |

[1] Product was more tacky than that from styrene and butadiene.

It should be noted also that the para-methyl styrene employed above was approximately only 57% pure. Ordinary styrene if below 85% purity is so unsatisfactory for this polymerization reaction as to be substantially unusable and here again alkyl substituted styrenes produce superior results to ordinary styrene. The substitution of an alkyl group in the para position of the styrene molecule thus activates the styrene in reactions of the Buna S type and also makes possible the preparation of a more tacky product.

It is also within the scope of this invention to polymerize a mixture of a diolefin, ordinary styrene and an alkyl or dialkyl styrene, p-methyl styrene, alpha methyl styrene, or p-methyl alpha methyl styrene.

In the compounding of these polymers the following formula was used:

| | Parts |
|---|---|
| Alkyl styrene-butadiene copolymer | 100 |
| Carbon black (kosmobile) | 50 |
| Stearic acid | 2 |
| Zinc oxide | 5 |
| Sulfur | 2 |
| Accelerator (Santocure [1]) | 1 |

[1] Condensation product of mercapto benzothiazole with cyclo hexylamine.

In preparing this formula, the coagulated, washed, and dried polymer is placed on the rolls and worked briefly until it forms a tight, plastic, smooth band around the forward roll. The compounding agents are then added slowly and the band of copolymer cut back and forth across the face of the roll until the compounding agents are thoroughly and uniformly incorporated into the polymer. The material is then vulcanized by heating the material in molds at 287° F. for 60 minutes.

In the past, it has been considered that copolymers could be prepared only from mixtures of substances which were individually polymerizable. In the present instance, this unexpectedly is not the case but the para-methyl-alpha-methyl styrene is not polymerizable alone but does interpolymerize.

The following observations are offered to demonstrate this point:

20 parts of styrene were mixed with 40 parts of a 2.5% aqueous solution of sodium oleate (having a pH of 9.7); with 5 parts of a 2.8% aqueous solution of potassium persulfate, and 0.7 part of "Lorol" mercaptan. This mixture was stirred by a high-speed mixer to cause emulsification, and the mixture was heated under pressure for approximately 60 hours at 50° C. A 100% yield of polystyrene was obtained from the reaction. The polystyrene polymer was recovered by coagulating the latex with brine, washing the product with water and dried for 48 hours at 170° F. This shows the ready polymerizability of normal styrene to yield a resin which is readily thermoplastic.

Similarly 20 parts of para-methyl-alpha-methyl styrene were mixed as before with 45 parts of a 2.5% aqueous solution of sodium oleate (pH of 9.7) together with 5 parts of a 2.8% aqueous solution of potassium persulfate and 0.17 part of "Lorol" mercaptan. This mixture also was stirred by a high-speed mixer to bring about emulsification and the emulsion was heated under pressure for approximately 60 hours at 50° C. No polymer was formed during this time interval and the para-methyl-alpha-methyl styrene was recovered from the mixture unchanged.

These results show the unexpected nature of the copolymer obtained, as above pointed out in the example.

The above disclosures utilize only butadiene as the diolefinic substance in the copolymerizate. The invention is equally applicable to substantially all of the substituted butadienes. Thus, a very valuable copolymer is prepared from a mixture of isoprene and para-methyl-alpha-methyl styrene, with a similar improvement in the ease of processing and milling. Similarly, an equally valuable copolymer of piperylene, which is 1-methyl butadiene, with para-methyl-alpha-methyl styrene is readily prepared by the same procedure to yield a copolymerizate with similarly valuable properties. Dimethyl butadiene, particularly the 2,3-dimethyl butadiene, is also readily copolymerized in emulsion with para-methyl-alpha-methyl styrene to yield useful copolymerizates. In fact, the reaction is applicable to the substituted butadienes or the conjugated dienes generally, and especially to those of 4 to 6 carbon atoms.

Para-methyl-alpha-alkyl styrenes are the preferred starting compounds in this invention, but in some instances valuable results can be obtained by the use of similar compounds having the methyl substituent in the ortho and meta positions. It may be noted that the substitution of a methyl group in the para position of the alpha-alkyl styrene molecule not only unexpectedly activates the styrene in these emulsion polymerization reactions, but also, the presence of the methyl group in the para position modifies the character of the resulting polymer by increasing the tackiness and plasticity of the finished polymer without reducing the tensile strength. Alpha-alkyl styrenes such as alpha-ethyl and alpha-propyl styrenes are also applicable.

Also, it is not necessary that the copolymerizate be prepared from two components only, but many modifications and three-component mixtures are even more advantageous. Thus, it is readily possible to prepare a copolymerizate of a butadiene with a portion of para-alkyl styrene and a further portion of unsubstituted styrene. Alternatively, it is possible to add other substances, such as acrylonitrile and various mixtures of the diolefins for the production of still more advantageous results.

Thus, the invention provides a new and useful interpolymer of a diolefin with an alkyl substituted styrene, which polymer has markedly superior physical, chemical, and processing properties over those of prior polymers.

This application is a continuation-in-part of application Serial Number 436,612, filed March 28, 1942, now abandoned.

While there are above disclosed but a limited number of embodiments of the invention, it is possible to produce still other embodiments without departing from the inventive concept herein disclosed, and it is therefore desired that only such limitations be imposed upon the appended claims as are stated therein or are required by the prior art.

The invention claimed is:

1. A rubber-like material comprising the emulsion polymerization product of about 26 parts by weight of para methyl alpha methyl styrene and about 74 parts by weight of butadiene-1,3.

2. A vulcanized rubber-like material comprising the precipitated emulsion polymerization product of about 26 parts by weight of para methyl alpha methyl styrene and about 74 parts by weight of butadiene-1,3, and a vulcanizing agent.

3. In a process of manufacturing a rubber-like material the step of copolymerizing in an aqueous emulsion about 26 parts by weight of para methyl alpha methyl styrene and about 74 parts by weight of butadiene-1,3.

PER K. FROLICH.
ERVING ARUNDALE.

REFERENCES CITED

The following references are of record in the file of this patent:

UNITED STATES PATENTS

| Number | Name | Date |
| --- | --- | --- |
| 1,938,730 | Tschunkur | Dec. 12, 1933 |
| 2,302,464 | Palmer | Nov. 17, 1942 |
| 2,450,028 | Weber et al. | Sept. 28, 1948 |